United States Patent [19]
Sato

[11] 4,437,741
[45] Mar. 20, 1984

[54] LIGHT MEASURING DEVICE FOR A SINGLE LENS REFLEX CAMERA

[75] Inventor: Yasuhisa Sato, Kanagawa, Japan

[73] Assignee: Canon Kabushiki Kaisha, Tokyo, Japan

[21] Appl. No.: 400,080

[22] Filed: Jul. 20, 1982

[30] Foreign Application Priority Data

Jul. 28, 1981 [JP] Japan ............................ 56-118889

[51] Int. Cl.³ .............................................. G03B 7/08
[52] U.S. Cl. ................................ 354/479; 354/152; 354/481
[58] Field of Search .............. 354/23 R, 54–56, 354/59, 42, 49, 152

[56] References Cited

U.S. PATENT DOCUMENTS 3,523,497  8/1970  Holle .................................... 354/55
4,174,894  11/1979  Fukuhara et al. ................... 354/59

FOREIGN PATENT DOCUMENTS 2314028  10/1974  Fed. Rep. of Germany .... 354/23 R

Primary Examiner—William B. Perkey
Attorney, Agent, or Firm—Toren, McGeady and Stanger

[57] ABSTRACT

A light measuring device for a single lens reflex camera provided with an auxiliary mirror for light measurement behind the movable mirror is disclosed. The reflection surface of the auxiliary mirror of said light measuring device is divided into a plurality of regions, and reflected light beams from the respective regions proceed in different directions from each other. Either one or both of the light beams reflected from one region and the beam reflected from the other region is or are selectively directed to a light sensitive element by a light beam selecting member.

5 Claims, 5 Drawing Figures

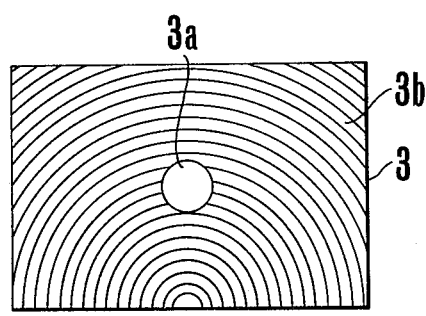
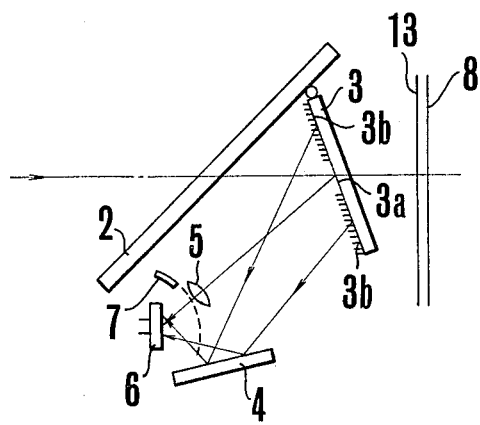

LIGHT MEASURING DEVICE FOR A SINGLE LENS REFLEX CAMERA

BACKGROUND OF THE INVENTION

1. Field of the Invention

This invention relates to light measuring devices for single lens reflex cameras, and, more particularly, to light measuring devices for single lens reflex cameras which have a plurality of reflecting regions in an auxiliary mirror for light measurement positioned in rear of the movable mirror.

2. Description of the Prior Art

In the past several proposals, concerning the light measurement by an auxiliary mirror behind the movable mirror of the single lens reflex camera, have been made in anticipation of the possibility of the light sensitive element of this type light measuring system also serving as a light sensitive element for the light reflected from the photographic film.

For example, in Japanese Laid-Open Patent Sho 50-82399, a portion of the movable mirror for the finder is made semi-transmissible and is rearwardly followed by a plain mirror or a concave mirror which following mirror directs part of the light from an object to be photographed to the light sensitive element. Another proposal in Japanese Laid-Open Utility Model Sho 53-148637 is that, in the same arrangement, the reflection surface of the auxiliary mirror, located behind the movable mirror for the finder, is imparted with a directional property to correct the light sensitivity distribution.

In these types of light measuring devices, however, the determination of the light measuring range has to be made in the manufacturing stage, therefore, it is impossible for the photographer to change the light measuring range. In back lighting scenes or in a theater using many spot lights, it very often happens that the camera must be operated so that the photographer has a choice between a center-weighted partial field of view light metering mode and an overall field of view or average light metering mode. Therefore, many photographic situations where the light metering system of such fixed light measuring range is felt inconvenient have been encountered.

SUMMARY OF THE INVENTION

It is an object of the present invention to provide a light measuring device for a single lens reflex camera with an auxiliary mirror for light measurement behind the movable mirror which makes it possible to change the light measuring range.

Another object of the present invention is to provide a light measuring device of simple form while still permitting a selection of different light measuring ranges.

These and other objects of the present invention will become apparent from the following detailed description of embodiments thereof.

BRIEF DESCRIPTION OF THE DRAWINGS

FIG. 2 is a plan view illustrating the details of the reflection surface of the auxiliary mirror of FIG. 1.

FIG. 3 is a section view of a second embodiment of a device according to the present invention.

DESCRIPTION OF THE PREFERRED EMBODIMENTS

Figure 1:
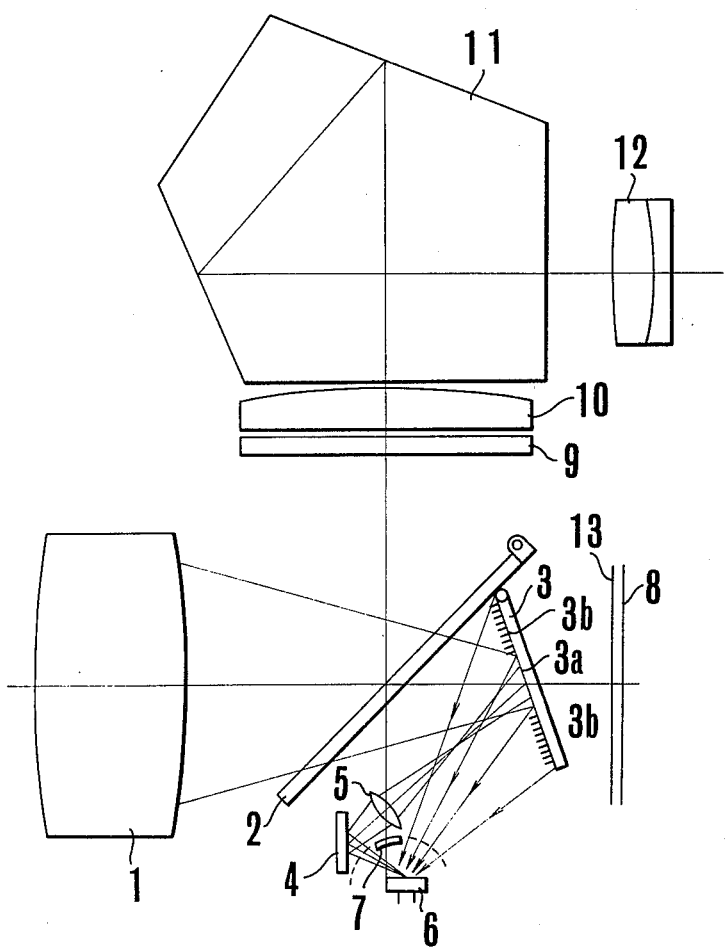
FIG. 1 is a cross sectional view, as seen from the end of the camera, of an embodiment of a light measuring device according to the present invention, illustrated with the other optics in a single lens reflex camera.

FIG. 1 illustrates the optics of the single lens reflex camera, as a whole, employing the light measuring device of the invention. 1 is a photographic objective lens; 2 is a movable mirror for a finder, which mirror is semi-transmissible to the light from the objective lens 1 either over the entire area thereof, or in a portion thereof; 3 is an auxiliary mirror for light measurement, positioned behind the movable mirror 2 and arranged to contact with the movable mirror 2 as the mirror 2 moves upwards when an exposure is to be made. The contact between the mirrors is arranged to be light-tight. The area of the reflection surface of said auxiliary mirror 3 is divided into a flat reflection part 3a, and part 3b which has a reflection characteristic causing reflection in a different direction from that of said flat reflection part 3a. The reflected light from the latter part 3b is directed directly to a light sensitive element 6. 4 is a reflection mirror which directs the reflected light from the flat reflection part 3a to the light sensitive element 6. 5 is a collection lens for light measurement arranged in a space between the auxiliary mirror 3 and the reflection mirror 4, said lens 5 lying in the path of reflected light from the flat reflection part 3a and refocusing a once formed object image bearing light beam. 7 is a light-shielding plate which allows for a selection between light measuring ranges. Said shielding plate 7 is movable along an arc, the path of said arc being illustrated by a dashed line. The shielding plate is operated from the outside of the camera so that the optical paths from the reflection parts 3a and 3b are selectively blocked and is further movable to a position where neither of the optical paths are blocked. 8 is a film; and 13 is a shutter. 9 is a focusing screen lying in an optically conjugate position to the film plane; 10 is a condenser lens; 11 is a penta dach prism; and 12 is a eye-piece.

FIG. 2 illustrates the reflection surface of the auxiliary mirror 3 for light measurement. The reflection part 3a is in the form of a flat-shaped reflection surface and part 3b is in the form of a Fresnel reflection surface of which the optical axis is downwardly eccentric. It is, of course, possible to construct the reflection part 3a in the form of a curved surface or a Fresnel surface to impart thereto a diverging power so that the back focus is increased. In this case there is no need to use the collection lens. It is also possible to construct the other reflection part 3b in a form other than the Fresnel surface such as a curved surface. It should be pointed out that for the performance of light measurement, even during the exposure, by the same light sensitive element 6, the light receiving surface of the light sensitive element 6 is required to be oriented towards the film plane.

The operation of the device of such construction is as follows: Light entering through the objective lens 1 is divided by the movable mirror 2 into two parts, one of which goes to the focusing screen 9 and the other of which passes therethrough to the auxiliary mirror 3. The light beam arriving at the focusing screen 9 further proceeds through the condenser lens 10, penta dach prism 11 and eye-piece 12 to reach the eye of the photographer. Of the light beam incident upon the auxiliary mirror 3 for light measurement, paraxial rays of light are reflected, by the reflection area 3a, towards the reflection mirror 4. Further, the rays going in the direction of the reflection mirror 4, through the collection lens 5, for light measurement are incident upon the light sensitive element 6. On the other hand, rays of light reflected from the area 3b of the auxiliary mirror 3 are directly incident on the light sensitive element 6.

A light measuring mode using only the light rays emanating from the area of spot 3a on the reflection surface of the auxiliary mirror 3 is to measure the brightness of the central portion of the viewfield, or to make the so-called spot metering exposure determination. Another light measuring mode using only the light rays emanating from the area 3b of the reflection surface is to measure an average brightness over the entire area of the image format, or to make the so-called average exposure determination. Therefore, when the light rays from the total image 3b are blocked by the light shielding plate 7, and only the light rays from the area of spot 3a are allowed to enter the light sensitive element 6, the camera is operated in a central field of view spot metering mode. Conversely when the light rays from the area of spot 3a are blocked by the light-shielding plate 7 and only the light rays from the total image area 3b are incident on the light sensitive element 6, the camera is operated in an overall field of view or average metering mode. Further when the light-shielding plate 7 is made so that it moves to a position where the light rays from the areas 3a and 3b are incident on the light sensitive element 6 at a time, a center-weighted light measuring mode can also be created.

Figure 4:
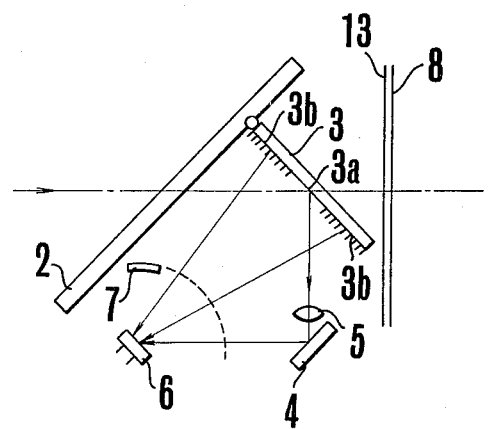
FIG. 4 is a section view of a third embodiment of a device according to the present invention.
Figure 5:
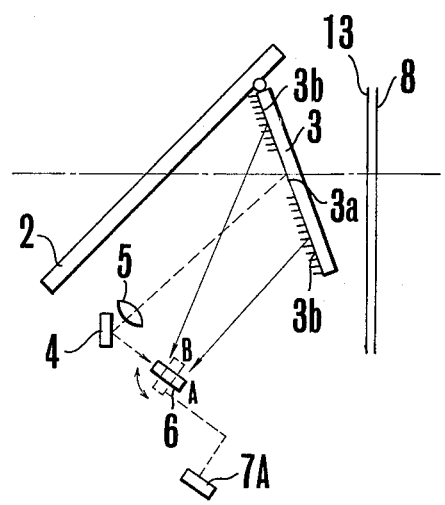
FIG. 5 is a section view of a fourth embodiment of a device according to the present invention.

FIGS. 3, 4 and 5 illustrate different embodiments of the present invention. In the embodiment illustrated in FIG. 3, the arrangement of the light sensitive element 6 and the reflection mirror 4 is inverted, as compared with the embodiment of FIG. 1, so that the light rays emanating from the total image area 3b of the auxiliary mirror 3 are directed through the reflection mirror 4 to the light sensitive element 6, while the light rays from the area of spot 3a pass directly to the light sensitive element 6.

In FIG. 4, the area of spot 3a is made to reflect light downward at 90° from the incident light path, and the reflected light is directed through the collection lens 5 and the reflection mirror 4 to the light sensitive element 6, while the total image area 3b is made to reflect light directly to the light sensitive element 6.

In the foregoing examples, the light rays are selectively blocked by the light shielding plate 7 to change over between the light measuring ranges, however, changing the light measuring range can be also performed by moving the light sensitive element 6. In FIG. 5, when light sensitive element 6 is in position A (solid line), only the reflected light from the total image area 3b of the auxiliary mirror 3 is read, thereby an average exposure determination is made. When the light sensitive element 6 is turned to position B (dashed line) by a light measuring range selecting member 7A mechanically linked to the light sensitive element holder, only the light from the area of spot 3a is read, thereby a spot exposure determination is made. In addition thereto, when in an intermediate point between the positions A and B, both of the areas 3a and 3b can influence the light sensitive element 6, whereby the weighting of the sensitivity on the center of the light measuring range can be varied depending upon the angular position of light sensitive element 6.

As has been described above, according to the present invention, the use of a light measuring sub-mirror 3 having divided areas of different directional characteristics makes it possible to selectively operate the camera in spot metering, average metering, or in center-weighted light metering.

It is to be noted that as the light measuring region changes, there is the possibility of changing the level of output of the light sensitive element. If so, such a problem can be solved by using a plurality of filters of different density to be selectively positioned in front of the light sensitive element in automatic response to selection of the metering modes, or by increasing or decreasing the level of output of the light sensitive element electrically in response to mode selection.

What I claim:

1. A light measuring device for a single lens reflex camera having a swinging mirror, comprising:
(a) light sensitive means;
(b) an auxiliary mirror positioned behind said swinging mirror to conduct a light beam passed through said swinging mirror to said light sensitive means, the reflection surface of said auxiliary mirror being divided into a plurality of regions and being shaped such that said light beam after reflection from the regions is divided into respective parts which go to different directions from each other; and
(c) light beam selecting means for conducting one of the light beams from said plurality of regions to said light sensitive means.

2. A light measuring device according to claim 1, wherein said light beam selecting means includes a shielding plate for selectively shielding the light beams from said plurality of regions.

3. A light measuring device according to claim 2, wherein said shielding plate is positioned in a space between said auxiliary mirror and said light sensitive means and rotates in an arcuate path.

4. A light measuring device according to claim 1, wherein said light beam selecting means includes a member coupled to said light sensitive means to selectively change the direction of the light receiving surface of said light sensitive means.

5. A light measuring device for a single lens reflex camera having a swinging mirror, comprising:
(a) light sensitive means;
(b) an auxiliary mirror positioned behind said swinging mirror to conduct a light beam passed through said swinging mirror to said light sensitive means, the reflection surface of said auxiliary mirror being divided into a plurality of regions and being shaped such that said light beam after reflection from the regions is divided into respective parts which go to different directions from each other; and
(c) means movable selectively to a 1st position where at least two light beams from said plurality of regions are conducted to said light sensitive means at a time and a 2nd position where one of the light beams from said plurality of regions is conducted to said light sensitive means.

* * * * *